United States Patent [19]

Schlesinger

[11] 4,306,953
[45] Dec. 22, 1981

[54] CATIONICALLY POLYMERIZABLE COMPOSITIONS CONTAINING SULFONIUM SALT PHOTOINITIATORS AND STABLE FREE RADICALS AS ODOR SUPPRESSANTS AND METHOD OF POLYMERIZATION USING SAME

[75] Inventor: Sheldon I. Schlesinger, East Windsor, N.J.

[73] Assignee: American Can Company, Greenwich, Conn.

[21] Appl. No.: 91,092

[22] Filed: Nov. 5, 1979

[51] Int. Cl.$^3$ .................... C08F 2/50; C08G 59/68
[52] U.S. Cl. ...................... 204/159.11; 204/159.18; 204/159.24; 525/121; 525/918; 526/193; 528/90; 528/361; 528/393; 528/408; 528/418; 427/54.1
[58] Field of Search .................................. 204/159.11

[56] References Cited

U.S. PATENT DOCUMENTS

| | | | |
|---|---|---|---|
| 2,807,648 | 9/1957 | Pitt | 260/607 |
| 3,374,160 | 3/1968 | Mao | 204/159.23 |
| 3,594,175 | 7/1971 | Hay | 96/115 |
| 3,657,088 | 4/1972 | Heine et al. | 204/159.15 |
| 3,692,560 | 9/1972 | Rosenkranz | 117/93.31 |
| 3,708,296 | 1/1973 | Schlesinger | 96/33 |
| 3,709,861 | 1/1973 | Anderson | 204/159.11 |
| 3,711,391 | 1/1973 | Feinberg | 204/159.11 |
| 3,715,293 | 2/1973 | Sandner et al. | 204/159.14 |
| 3,742,089 | 6/1973 | Schroeter | 204/159.19 |
| 3,794,576 | 2/1974 | Watt | 204/159.11 |
| 3,875,094 | 4/1975 | Schroeter et al. | 204/159.15 |
| 3,885,180 | 12/1975 | Schroeter | 204/159.19 |
| 3,968,056 | 7/1976 | Bolon et al. | 204/159.15 |
| 3,989,644 | 11/1976 | Bolon et al. | 204/159.18 |
| 4,017,652 | 4/1977 | Gruber | 204/159.23 |
| 4,058,400 | 11/1977 | Crivello | 204/159.18 |
| 4,058,401 | 11/1977 | Crivello | 204/159.18 |
| 4,061,652 | 12/1977 | Schroeter | 260/45.8 NT |
| 4,069,054 | 1/1978 | Smith | 96/115 P |
| 4,069,055 | 1/1978 | Crivello | 204/159.14 |
| 4,069,056 | 1/1978 | Crivello | 204/159.18 |
| 4,076,489 | 2/1978 | Schroeter et al. | 427/54 |
| 4,081,276 | 3/1978 | Crivello | 204/159.18 |
| 4,082,891 | 4/1978 | Curry et al. | 204/159.14 |
| 4,088,801 | 5/1978 | Bolon et al. | 204/159.14 |
| 4,090,936 | 5/1978 | Barton | 204/159.18 |
| 4,102,687 | 7/1978 | Crivello | 204/159.18 |
| 4,116,788 | 9/1978 | Schmitt et al. | 204/159.23 |
| 4,138,255 | 2/1979 | Crivello | 204/159.19 |
| 4,150,988 | 4/1979 | Crivello | 204/159.18 |
| 4,156,035 | 5/1979 | Tsao et al. | 204/159.11 |
| 4,197,174 | 4/1980 | Chang | 204/159.11 |
| 4,201,640 | 5/1980 | Watt | 204/159.11 |
| 4,250,203 | 2/1981 | Schlesinger et al. | 204/159.11 |

FOREIGN PATENT DOCUMENTS 845746 3/1977 Belgium.
960192 6/1964 United Kingdom.

OTHER PUBLICATIONS

Kochi, "Free Radicals", pp. 557–559 (1973).
Handbook of Epoxy Resins by H. Lee and K. Neville, McGraw-Hill (1967).
Crivello et al. Journal of Radiation Curing, vol. 4, p. 2 (1977).
Crivello et al. Journal of Radiation Curing "Triarylsulfonium Salts: A Class of Photoinitiators for Cationic Polymerization", vol. 5, p. 2 (Jan. 1978).
UV Curing: Science and Technology S.P. Pappas et al. Technology Marking Corporation, Stamford, Connecticut.
Anderson et al., "The Synthesis and Stereochemistry of Triarylsulfonium Salts "Journal of Organic Chemistry, vol. 35, p. 706 (Mar. 1970).
Chemische Berichte, vol. 55B pp. 2346–2356 (1922).
Acheson et al, "The Synthesis, Spectra and Reactions of Some S-Alkylthio-Phenium Salts", Journal of the Chemical Society, 1970 p. 1764.
Wiegand et al., "Syntheses and Reactions of Triarylsulfonium Halides", Journal of Organic Chemistry, vol. 33, p. 2671 (Jul. 1968).
Journal of Organic Chemistry, vol. 36, p. 3149 (1971).
Ohkubo et al., "An Ultraviolet Spectroscopy Study on Sulfonium Salts and on an Interaction Between Sulfonium Salts and Molecular Oxygen".
Ketley et al. "The Photopolymerization of Epoxides by Complex Salts of Sulfur Cations", Polymer Preprints, vol. 19, p. 656 et seq. (Sept. 1978).
Journal American Chemical Society, vol. 91 Jan.–Feb. 1969 p. 145.
Organic Chemistry of Stable Free Radicals, A. R. Forrester, J. M. Hay, R. H. Thomson, pp. 138–179 (1968).

*Primary Examiner*—John C. Bleutge
*Assistant Examiner*—A. H. Koeckert
*Attorney, Agent, or Firm*—Robert P. Auber

[57] ABSTRACT

Photopolymerizable compositions using sulfonium salt photoinitiators to effect polymerization of cationically polymerizable monomers additionally include a stable free radical to reduce or eliminate the sulfur odor generated upon photodecomposition of the sulfonium salt photoinitiator. The stable free radicals are soluble in the polymerizable material and are stable in the composition at ambient temperatures. Especially useful is 2,2-diphenyl-1-picrylhydrazyl.

15 Claims, No Drawings

CATIONICALLY POLYMERIZABLE COMPOSITIONS CONTAINING SULFONIUM SALT PHOTOINITIATORS AND STABLE FREE RADICALS AS ODOR SUPPRESSANTS AND METHOD OF POLYMERIZATION USING SAME

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well-known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip for container bodies, blanks and closures, or where plastic strip and paperboard are coated and formed.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing in the production line.

In Schlesinger U.S. Letters Pat. No. 3,708,296, granted Jan. 2, 1973, there are disclosed photopolymerizable epoxide formulations containing diazonium salts as photoinitiators which polymerize rapidly upon exposure to electromagnetic radiation to provide durable coatings.

In Watt U.S. Letters Pat. No. 3,794,576, granted Feb. 26, 1974, there are described desirable epoxy formulations which combine the desired rheological properties with suitable pot life and rapid curing at ambient temperatures, by incorporation of a photoinitiator and at least about 15 percent by weight of an epoxidic ester having epoxycycloalkyl groups. However, such esters do materially increase the cost of the formulation as compared with the more conventional epoxide prepolymer materials.

Since the disclosures of Schlesinger and Watt, a number of patents and publications have appeared proposing various photoinitiators for the epoxy formulations which could replace the diazonium catalysts specifically described in the Schlesinger and Watt Patents. Among these are the sulfonium salt catalysts disclosed in Smith U.S. Pat. No. 4,069,054 granted Jan. 17, 1978; Barton U.S. Letters Pat. No. 4,090,936 granted May 23, 1978; and Crivello U.S. Letters Pat. Nos. 4,069,055 granted Jan. 17, 1978 and No. 4,058,401 granted Nov. 15, 1977.

Generally, these sulfonium compounds have the structural formula shown and described in Crivello U.S. Letters Pat. No. 4,058,401 at column 2, lines 1-20:

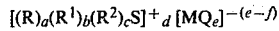

$$[(R)_a(R^1)_b(R^2)_cS]^+{}_d [MQ_e]^{-(e-f)}$$

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of $a+b+c$ is a value equal to 3 or the valence of S; $d=e-f$; f=valence of M and is an integer equal to from 2 to 7 inclusive; e is greater than f and is an integer having a value up to 8.

Both General Electric Company and Minnesota Mining and Manufacturing Company have made efforts to commercialize catalyst systems using what appear to be mixtures of triarylsulfonium hexafluorophosphate compounds, but which are generally identified as triphenylsulfonium hexafluorophosphate.

Although this class of compounds is an effective photoinitiator, the range of ultraviolet radiation to which the triphenyl sulfonium hexafluorophosphate compounds are sensitive is somewhat limited. More recently, it has been found that bis-[4-(diphenylsulfonio)phenyl] sulfide bis-hexaflurophosphate compounds are effective photoinitiators with a broader range of spectral sensitivity in the ultraviolet range. The method of making such photoinitiators and the use thereof in the cationic polymerization of epoxy compounds are disclosed and claimed in Watt U.S. patent application Ser. No. 20,340 filed Mar. 14, 1979, now U.S. Pat. No. 4,201,640, granted May 6, 1980, and Chang U.S. patent application Ser. No. 20,514 filed Mar. 14, 1979, now U.S. Pat. No. 4,197,174, granted Apr. 8, 1980.

However, both of the above classes of sulfonium salt photoinitiators suffer from a common problem, namely, the evolution of malodorous organic sulfur compounds when the polymerizable compositions are subjected to electromagnetic radiation to effect decomposition thereof. These compounds are believed to be organic sulfides or mercaptans, and the term "organic sulfur compound" is used herein to generically encompass all such malodorous organic sulfur compounds resulting from the photodecomposition of sulfonium salt photoinitiators. This malodorous condition may have been sufficient to discourage more widespread adoption of such photoinitiators in commercial processes.

In the recent application of Sheldon I. Schlesinger and Dennis E. Kester, Ser. No. 71,283 filed Aug. 30, 1979, and now issued as a U.S. Pat. No. 4,250,203, there are disclosed and claimed polymerizable compositions using sulfonium salt photoinitiators and containing as odor suppressants certain organic compounds which decompose upon exposure to the electromagnetic radiation used to initiate polymerization to provide an activated triplet state or a free radical which reacts with the sulfur compounds. Such compositions have proven highly effective in reducing sulfur odors during polymerization.

Accordingly, it is an object of the present invention to provide a novel photoinitiable cationically polymerizable composition utilizing sulfonium salt photoinitiators, which composition evidences clearly reduced or eliminated malodorous properties.

It is also an object to provide such a composition which is relatively stable during extended periods of storage and which will nevertheless polymerize rapidly to produce coatings with desirable mechanical properties.

3

Another object is to provide a novel polymerization process using such a composition and which is adaptable to a wide variety of high speed coating lines and which does not require extensive or expensive equipment to effect polymerization of the applied coating.

SUMMARY OF THE INVENTION

It has now been found that the foregoing and related objects may be readily attained in a photopolymerizable composition containing 50–99 percent by weight of a cationically polymerizable material. There is incorporated at least 0.1 percent by weight of a sulfonium salt photoinitiator which decomposes upon exposure to electromagnetic radiation to generate a Lewis acid to initiate polymerization of the cationically polymerizable material, and a product of the decomposition includes a malodorous organic sulfur compound. The composition additionally includes 0.1 to 15 percent by weight of a stable free radical operable to react with the organic sulfur compound released upon decomposition of the photoinitiator to reduce the sulfur odor generated by the decomposition. The free radical is soluble in the polymerizable material and stable in the composition at ambient temperatures.

Preferably, the cationically polymerizable material includes an epoxidic prepolymer material in an amount providing at least about 40 percent by weight thereof. The sulfonium salt photoinitiator may have the general structural formula set forth in the aforementioned Crivello U.S. Pat. No. 4,058,401, or it may be a bis-sulfonium salt having either of the following structural formulae:

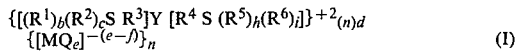

(I)

and

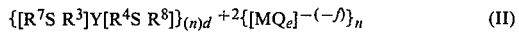

(II)

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein b and h may be equal to the integer 0, 1 or 2; wherein c and i may be equal to the integer 0, 1 or 2; wherein the sum of b+c, or of h+i, is 2; wherein $d = \frac{1}{2}(e-f)$ and n is the multiplier of d necessary to produce a whole number; wherein f=the valence of M and is an integer from 2–7 inclusive; wherein e is greater than f and is an integer having a value up to 8.

Preferably, the sulfonium salt photoinitiator is present in an amount equal to 0.1–10 percent by weight of the composition. When the sulfonium salt photoinitiator is a sulfonium salt of the type described in the aforementioned Crivello patent, the stable free radical is desirably present in an amount equal to at least about the molar equivalent of the sulfonium salt photoinitiator. When the sulfonium salt photoinitiator is a bis-sulfonium salt, the stable free radical is desirably present in an amount equal to at least about twice the molar equivalent of the sulfonium salt photoinitiator.

The preferred stable free radicals are organic hydrazyls, and particularly triarylhydrazyls with at least two, and desirably three, electron withdrawing groups on the arylamino ring. Particularly effective is 2,2-diphenyl-1-picrylhydrazyl.

In the method of polymerization of the present invention, the several components are admixed to provide a polymerizable composition, and this composition is then exposed to electromagnetic radiation to decompose the sulfonium salt photoinitiator and to generate a Lewis acid to polymerize the polymerizable material. The stable free radical concurrently reacts with organic sulfur compounds generated thereby so that the polymerization is characterized by substantial freedom from malodorous sulfur compounds.

In its most usual form, the method will involve the step of applying the photopolymerizable composition to a substrate as a coating prior to the step of exposure of the composition to electromagnetic radiation. If so desired, to effect rapid curing at ambient temperatures when the cycloaliphatic epoxides of the aforementioned Watt patent are not employed, the composition may be maintained at a temperature of 50°–90° C. for a period of 0.5 second–2 minutes following initiation of exposure to radiation in order to effect rapid curing to a tack-free condition.

DETAILED DESCRIPTION OF THE PREFERRED EMBODIMENTS

As previously indicated, the compositions of the present invention essentially comprise a mixture of a cationically polymerizable material, a sulfonium salt photoinitiator, and a stable free radical. Upon exposure to electromagnetic radiation, the sulfonium salt photoinitiator decomposes to initiate polymerization of the cationically polymerizable material while at the same time producing a malodorous organic sulfur compound. The stable free radical reacts with the organic sulfur compounds so as to reduce the sulfur odor.

The cationically polymerizable materials which may be used herein preferably comprise epoxidic prepolymer materials either alone or as the principal constituent. However, various other organic monomers are also known to be cationically polymerizable and may comprise either all or a part of the cationically polymerizable material. Such vinyl organic monomers include vinylidene aromatic hydrocarbons such as styrene; vinylethers such as isobutyl vinylether and n-octyl vinylether; acrolein; vinylarenes such as 1-vinylpyrene and acenaphthalene; vinyl cycloaliphatics such as vinyl cyclohexane; conjugated dienes such as isobutylene, butadiene and isoprene. In addition, cyclic ethers such as oxetanes and oxolanes, e.g., tetrahydrofuran and trioxane, may be employed. Other groups of compounds comprise the cyclic esters such as the beta-lactones, e.g., propiolactones; and cyclic amines such as 1,3,3,trimethylazetidine. Another class of cationically polymerizable materials comprises cyclic organosilicon compounds such as hexamethyl trisiloxane. Still another class of materials which can be used as the cationically polymerizable material comprises thermosetting organic condensation resins of an aldehyde such as urea-/formaldehyde resins, phenol/formaldehyde resins, melamine/formaldehyde resins, and the like, as described in Crivello U.S. Letters Pat. No. 4,102,687 granted July 15, 1978.

Moreover, the cationically polymerizable material may be a prepolymer or low molecular weight polymer, either of the vinyl family or of the epoxy family. Vinyl prepolymers include multifunctional vinylethers and low molecular weight diene polymers.

Suitable cationically polymerizable materials are described at length in Pappas, "UV CURING: SCIENCE AND TECHNOLOGY", (Technology Marketing Corporation, Stamford, Connecticut); Crivello U.S. Letters Pat. No. 4,150,988; Crivello U.S. Letters Pat. No. 4,102,687; and Crivello U.S. Letters Pat. No. 4,069,056.

As previously indicated, the preferred cationically polymerizable materials are comprised at least principally of epoxide prepolymer materials, and these may comprise any monomeric or oligomeric material containing at least one functional epoxy group or oxirane ring so that they may be polymerized upon opening of the oxirane ring. In addition, polymeric epoxy materials may be employed if they may be dispersed in the composition and are capable of undergoing further polymerization to produce a solid polymer. The epoxy compounds may be aliphatic, cycloaliphatic, aromatic or heterocyclic. The epoxidic prepolymer should contain no functional groups more basic than the oxirane ring and should be a solvent for the initiator and scavenger. Most desirably, the prepolymer should contain a reasonable percentage of epoxy compounds containing two or more epoxy groups per molecule.

The polymerizable epoxy material will comprise epoxide resins used either singly or in combination and will have an average epoxide value of about 0.1–1.0. The carbon chains having the epoxy groups may include additional substituents including ethers, esters, halogens, phosphates, and the like, and the compounds may include other polymerizable functional groups such as acrylates and silicones.

Typical epoxy materials are readily available commercially, the most common being those which are the product of bis-phenol A with epichlorohydrin or those resulting from the reaction of epichlorohydrin with a phenol/formaldehyde resin of relatively low molecular weight. Reference may be made to the HANDBOOK OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In the aforementioned Watt U.S. Letters Pat. 3,794,576, there are described radiation-sensitive epoxidic blends containing at least about 15 percent by weight of an epoxidic ester having at least two epoxycycloalkyl groups per molecule in order to achieve rapid polymerization and curing of the composition at ambient temperatures upon exposure to ultraviolet radiation or the like. Such compounds are conveniently esters of an epoxidized cyclic alcohol and an epoxidized cycloalkanecarboxylic acid or esters of an alkylsubstituted (epoxycycloalkane)methanol and a dibasic acid. A number of suitable compounds are disclosed in the aforementioned Watt Patent.

Although not essential and sometimes undesirable, the polymerizable epoxy composition may contain diluents to improve viscosity, and these diluents may be reactive such as those produced by reaction of an alcohol or a phenol with epichlorohydrin. Exemplary of reactive diluents is the reaction product of nonylphenol with epichlorohydrin. The amount of diluent may vary from zero to as much as 45 percent of the polymerizable material if a reactive diluent is employed and is preferably less than 15 percent if nonreactive diluents such as dibutylphthalate are employed.

For some applications, the composition may contain an inert pigment or dye to provide a desired coloration. Generally, such pigments and dyes will comprise less than about 45 percent by weight of the composition. For certain appalications, it may be desired to include an inert filler such as talc or silica where such fillers will not adversely affect the desired properties for the cured composition. They will normally comprise less than 45 percent by weight and preferably less than 25 percent by weight of the polymerizable composition.

Recently, it has been found that desirable coating compositions can be prepared by admixing an epoxidic prepolymer material and a vinyl chloride dispersion polymer. As pointed out in the copending application of Joseph M. Guarnery et al, Ser. No. 21,914 filed Mar. 19, 1979 and entitled POLYMERIZABLE COATING COMPOSITION CONTAINING POLYMERIZABLE EPOXIDE COMPOUND AND VINYL CHLORIDE DISPERSION POLYMER AND METHOD OF COATING UTILIZING SAME AND COATED ARTICLES PRODUCTED THEREBY, the vinyl chloride dispersion polymer should be wettable by, but substantially insoluble in, the epoxy prepolymer material. Generally, the polymers will be homopolymers of vinyl chloride, although copolymers of vinyl chloride with up to 15 percent by weight, and preferably lss than 10 percent by weight, of vinyl acetate may be employed. Conventionally, such dispersion polymers have a high molecular weight as represented by an inherent viscosity of 0.60–1.60 as determined by the method of ASTM D1243-66 and a particle size of 0.5–20.0 microns, and are produced by emulsion polymerization processes.

The epoxy and vinyl chloride resin components are generally admixed to form the polymerizable material in a weight ratio of 35–80 parts epoxy prepolymer material to 20–60 parts vinyl chloride polymer. Preferably, the ratio is 45–65 parts epoxy prepolymer material to 35–55 parts vinyl chloride polymer. The ratio may be varied to modify the difference between the glass transition temperature (Tg) of the two components within the coating. This is desirable to ensure that the processing temperature to which the coated substrate will be subjected will normally fall between the two glass transition temperatures.

When a vinyl chloride dispersion polymer is to be included in the epoxidic prepolymer material, the epoxy compounds should not include more than 15 percent by weight thereof of compounds having epoxycycloalkyl groups and preferably should exclude such compounds. Thus, the desirable epoxycycloalkyl esters of the aforementioned Watt U.S. Letters Pat. No. 3,794,576 should be excluded or included in an amount of less than 15 percent by weight since they have been found to undesirably swell the dispersion polymer and unduly affect rheological properties. In addition, these esters appear to penetrate into the vinyl chloride polymer so that they do not provide the ambient temperature curing benefits of the epoxy compositions of the aforementioned Watt Patent.

The polymerizable material may also include minor amounts of a free radical polymerizable material such as the acrylate monomers as described in claimed in Tsao et al. U.S. Letters Pat. No. 4,156,035, granted May 22, 1979. Such acrylate monomers include multifunctional acrylate and methacrylate materials such as trimethylol propene triacrylate, ethylene glycol diacrylate, diethylene glycol diacrylate and the corresponding methacrylates. When such polymerizable acrylate monomers are employed, they should comprise less than 50 percent by weight of the polymerizable material and preferably less than 30 percent by weight.

As previously indicated, the sulfonium salt photoinitiator may be of the tri(aryl/alkyl/heterocyclic) type of the aforementioned Crivello Patent or of the bis-[tri(aryl/alkyl/heterocyclic)] type of the aforementioned Watt and Chang patent applications. The tri(aryl/alkyl/heterocyclic) sulfonium salt photoinitiators are discussed at length in the aforementioned Crivello U.S. Letters Pat. No. 4,058,041 and Smith U.S. Letters Pat. No. 4,069,054. The general formula for this class of photoinitiator is set forth in the aforementioned Crivello Patents:

where R is a monovalent aromatic organic radical; $R^1$ is a monovalent organic aliphatic radical selected from alkyl, cycloalkyl and substituted alkylk; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of $a+b+c$ is value equal to 3 or the valence of S; $d=e-f$; $f=$ valence of M and is an integer equal to from 2 to 7 inclusive; and e is greater than f and is an integer having a value up to 8.

Exemplary of such sulfonium salt photoinitiators are the following: triphenylsulfonium tetrafluoroborate, methyldiphenylsulfonium tetrafluoroborate, dimethylphenylsulfonium hexafluorophosphate, triphenylsulfonium hexafluorophosphate, triphenylsulfonium hexafluoroantimoate, diphenylnaphthylsulfonium hexafluoroarsenate, tritolysulfonium hexafluorophosphate, trifluoromethyldiphenylsulfonium tetrafluoroborate, and dimethylnaphthylsulfonium hexafluorophosphate. Additional compounds may be found in the aforementioned Crivello and Smith patents, as well as in Crivello et al "Triaryl Sulfonium Salts: A New Class of Photoinitiators for Cationic Polymerization", JOURNAL OF RADIATION CURING, Volume 5, pages 2, 10–11, January 1978, and Pappas "UV CURING: SCIENCE AND TECHNOLOGY", (Technology Marketing Corporation, Stamford, Connecticut).

The second class of sulfonium salt photoinitiators may have any one of the following general formulae:

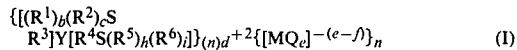 (I)

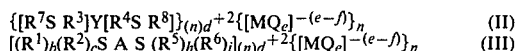 (II)
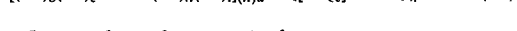 (III)

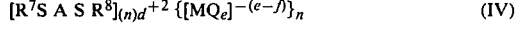 (IV)

wherein Y may be omitted or may be a bridging atom or group which connects $R^3$ and $R^4$, e.g., a divalent sulfur —S—, a divalent oxygen —O—, a divalent nitrogen

or a divalent carbon

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein $R^3$ and $R^4$ are organic aromatic radicals which may or may not be ring-substituted; wherein $R^7$ and $R^8$ are polyvalent organic radicals forming a heterocyclic or fused ring structure with the sulfur atom and may be the same or different; wherein $R^9$, $R^{10}$ and $R^{11}$ may be hydrogen, or substituted or unsubstituted alkyl or aryl groups; wherein A is equal to an aromatic ring sytem, either monocyclic or polycyclic, or a heterocyclic aromatic, monocyclic or polycyclic ring system, or an aromatic or heterocyclic ring system condensed with a cycloaliphatic ring system; wherein b and h may be equal to the integer 0, 1 or 2; wherein c and i may be equal to the integer 0, 1 or 2; wherein the sum of $b+c$, or of $h+i$, is 2; wherein $d=\frac{1}{2}(e-f)$ and n is the multiplier of d necessary to produce a whole number; wherein $f=$ the valence of M and is an integer from 2–7 inclusive; wherein e is greater than f and is an integer having a value up to 8.

Simple methods for making such salts are described in the aformentioned United States applications of Watt and Chang. Exemplary of this class of sulfonium salt photoinitiator are bis-[4-(diphenylsulfonio) phenyl] sulfide bis-hexafluorophosphate; bis-[4-(diphenylsulfonio) phenyl] ether bis-hexafluorophosphate; bis-[4-(diphenylsulfonio) phenyl] ketone bis-hexafluorophosphate; bis-[4-tetramethylenesulfonio) phenyl] sulfide bis-hexafluorophosphate; bis-[4-(tetramethylenesulfonio)

phenyl] sulfide bis-tetrafluoroborate; and bis-[4-(diphenylsulfonio) phenyl] sulfide chlorostannate.

The amount of the sulfonium salt photoinitiator may vary within a fairly wide range of 0.2–10 percent by weight of the composition, recognizing that at least about 0.1 percent by weight, based upon the polymerizable material, is generally necessary to initiate polmerization. To effect polymerization rapidly, the amount should comprise at least about 0.5 percent by weight of the polymerizable material. Although amounts of up to 5 percent by weight provide increasing reaction rate, amounts thereabove provide no significant additional benefit in reaction rate and tend to deleteriously affect the physical properties of the polymer method. Thus, a practical upper limit for the sulfonium photoinitiator is 10 percent by weight, based upon the weight of polymerizable material, and the preferred range is 0.5–4.0 percent.

The stable free radicals of this invention are characterized by resonance and steric stability so as to exist under ambient conditions in a monomeric or non-dimerized form. They must be soluble in the polymerizable material, sufficiently stable to resist oxidation or hydrolysis either in the solid state or in the polymerizable formulation, and must not dimerize either in the solid state or in the polymerizable formulation. The stable free radicals should not exhibit any substantial tendency to react with the sulfonium salt photoinitiators of the compositions so as to reduce their effectiveness as ultraviolet-sensitive curing agents, and they should also not exhibit any substantial tendency to react with the polymerizable materials so as to cause premature gelation in the absence of the photoinitiating radiation of the appropriate wavelength or exhibit any excessive inhibition of the radiation-induced polymerization or curing process. They should not prematurely abstract hydrogen atoms from other components of the coating formulation so as to destroy their effectiveness. The stable free radicals are able to couple with mercaptophenyl radicals or other sulfur-containing compounds produced by photolysis of the sulfonium salt photoinitiators in order to prevent the evolution of malodorous compounds during and subsequent to polymerization. Lastly, the stable free radical must have a pH of about neutral (6.0–8.0) to avoid undue effect upon the polymerization reaction and other components.

Various stable free radicals are known and described in the literature including those in FREE RADICALS by Kochi (John Wiley & Sons, 1973). The specific material selected will depend upon the other components of the formulation.

Experimentation to date has indicated that the preferred class of stable free radicals which best suits the aforementioned criteria are the organic hydrazyls, and preferably those triarylhydrazyls with at least two, and desirably three, electron withdrawing groups on the arylamino ring, such as $-NO_2$, $-SO_3K$ and $-COO-CH_3$ groups. Most effective is 2,2-diphenyl-1-picryl-hydrazyl (DPPH) since it is readily available, readily soluble in the formulation and quite stable in expoxide formulations which has the following structural formula:

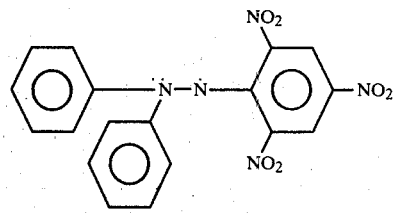

Such compounds are discussed by Kochi, supra, at Vol. 2, pages 557 et seq., and A. R. Forrester et al., ORGANIC CHEMISTRY OF STABLE FREE RADICALS (Academic Press, London, 1968) at pages 138–179.

The amount of the stable free radical may vary within fairly wide limits of 0.1–15 percent by weight of the composition depending upon the amount of the sulfonium salt photoinitiator employed and upon the possible deleterious effect which unnecessarily large amounts of the free radical may have upon the physical properties of the polymer. Generally, it is desirable to provide the stable free radical in an amount equal to at least that theoretically necessary to react with the organic sulfur compounds produced by decomposition of the sulfonium salt photoinitiator and preferably in an amount equal to 1–2 times that theoretically required to react with the organic sulfur compounds.

The theory of operation is not fully understood but the following explanation is believed to apply. It is known that the sulfonium salt photoinitiators of the present invention will decompose upon exposure to electromagnetic radiation so as to provide a Lewis acid which is effective to initiate polymerization of the cationically polymerizable material. The term "Lewis acid" as used herein is intended to encompass compounds produced by decomposition and which will directly or indirectly receive an electron pair from the monomer to initiate polymerization, as for example from the oxygen of the oxirane ring to open the oxirane ring. The classic Lewis Acid precursor decomposition mechanism is described in the aforementioned Watt U.S. Pat. No. 3,794,576 with respect to a diazonium initiator. As is well known, the term "Lewis acid" in its broad scope includes protonic or Brønsted acids.

The decomposition mechanism for triarylsulfonium salts to provide an indirectly formed Lewis Acid has been postulated by Crivello et al in "Triarylsulfonium Salts: A New Class of Photoinitiators for Cationic Polymerization" in JOURNAL OF RADIATION CURING, Vol. 5, page 2 (January 1978). The authors postulate that the decomposition of the diaryl- and triarylsulfonium salts produces a Brønsted acid which in turn provides a proton which will function as the Lewis Acid to accept electrons from an oxygen of an oxirane ring in an epoxide monomer and initiate polymerization in accordance with the following mechanism, as shown in equations (1)–(3):

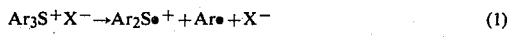 (1)

 (2)

 (3)

Regardless of the theory of the action embraced, it is apparent that the photoinitiator is decomposing to generate in the reaction medium an electron acceptor acting as a Lewis acid to open an oxirane ring in an epoxide compound or otherwise accepting an electron pair from other cationically polymerizable monomers and thereby initiating cationic polymerization of the monomer material. The reaction then proceeds as additional monomer units are activated until all of the monomer has been polymerized or until impurities interfere with the reaction mechanism.

The theory of the origin or the unpleasant odor is not fully understood although it is believed likely to be due to an organic sulfide or mercaptan formed in the course of photolysis. It is believed that phenyl sulfide is formed during the photolysis but that it forms benzenethiol in the presence of a hydrogen atom donor molecule is accordance with the following equations (4) and (5):

$$C_6H_5SC_6H_5 \rightarrow C_6H_5\bullet + C_6H_5S\bullet \quad (4)$$

$$C_6H_5S\bullet + YH \rightarrow C_6H_5SH + Y\bullet \quad (5)$$

However, another possibility is the direct interaction of an aryl sulfide or other thioaryl radical with a hydrogen donor molecule.

The theory of operation of the stable free radical in the compositons of the present invention is also not fully understood. It is postulated that the thioaryl radicals or other organic sulfide radicals will react with the stable free radical to form a reaction product which is much less volatile or which is more pleasant and acceptable, and possibly less toxic, than the organic sulfur compound. Moreover, it is possible that the resulting product of this interaction is trapped in the polymerized composition.

The following reaction of the stable free radical R• may be postulated with respect to organic sulfides or mercaptans:

$$R\bullet + ArS\bullet \rightarrow ArSR \quad (6)$$

Regardless of the theory of operation, it has been found that the compositions of the present invention which employ the stable free radical envidence greatly suppressed odors of the type which have therefore typified compositions containing sulfonium salt photoinitiators.

As indicated, the photoinitiator is decomposed into a Lewis acid by exposure to electromagnetic radiation. Although electron beam bombardment, X-ray radiation, and other similar forms of high energy radiation may be employed for this purpose, exposure to ultraviolet radiation has been found highly satisfactory and is desirable for commercial applications. The exposure to radiation normally required may be of extremely short duration, periods of about one-half to three seconds being normally adequate for most compositions depending upon the intensity of the radiation at the surface. However, for relatively thick deposits of the composition, it may be desirable to extend the period of exposure to five seconds or even more, to ensure adequate penetration of the radiation through the depth of the coating.

In the polymerization of epoxide prepolymer compositions which do not include the desirable epoxycycloalkyl compounds of the aforementioned Watt U.S. Pat. No. 3,794,576 to provide a rapid cure rate at ambient temperatures, it is possible to obtain rapid polymerization of at least the surface portion by maintaining the composition within a relatively narrow elevated temperature range for a period of 0.5 second–2 minutes following initiation of exposure to the electromagnetic radiation. This will produce the desired rapid polymerization of the epoxidic prepolymer material to a tack-free surface condition within a period of less than 30 seconds. Although this elevated temperature range may extend from 50° C. to as high as 90° C., it is generally held within the range of 55°–75° C. to obtain the desired rate of polymerization while avoiding adverse effects on the resulting polymer and the desired physical properties.

The temperature of the composition may be elevated to the desired temperature range by any suitable means including induction heating when a metallic substrate or container is employed; conductive heating; convection heating; and radiation heating by exposure to a source of suitable radiant heat such as infrared lamps. For convenience and for minimization of the equipment requirements, infrared radiation provided by suitable lamps is most desirably employed in conjunction with the source of ultraviolet radiation used to produce decomposition of the initiator.

The compositions of the present invention are particularly useful for making durable coatings for either aesthetic or protective purposes. Epoxy compositions find particular advantage in the field of grahic arts because of the resistance of the coating to solvents and chemicals as well as to abrasion, because of the excellent adhesion to various surfaces including metals, and because of the ability to withstand drawing and forming operations.

Illustrative of the efficacy of the present invention are the following specific examples wherein all parts are parts by weight unless otherwise indicated.

EXAMPLE ONE

A formulation was prepared using 2,2-diphenylpicrylhydrazyl as a stable free radical serving as a potential odor suppressor or organic sulfur compound scavengers in accordance with the following basic formulation:

| Component | Parts |
|---|---|
| 3,4-epoxy cyclohexylmethyl-3,4-epoxy cyclohexane carboxylate (sold by Ciba-Geigy under the designation CY-179) | 77.62 |
| butanediol aliphatic diglycidyl ether (sold by Ciba-Geigy under the designation RD-2) | 19.43 |
| silicone resin flow agent (sold under the designation SR-82 by General Electric) | 2.40 |
| flow agent (sold by Byk-Malinckrodt under the designation BYK T-104) | 0.50 |
| sulfonium salt photoinitiator (a 50% by weight solution in propylene carbonate of crude bis-[4-(diphenylsulfonio) phenyl] sulfide bis-hexafluorophosphate | 4.0 |
| 2,2-diphenylpicrylhydrazyl | 3.76 |

The formulation was applied to aluminum panels with a No. 3 wire wound rod and exposed to a 360 watt UVIARC lamp. The coated test panels were smelled immediately after exposure, and curing was determined by pressing the finger into the coating. The relative humidity was 60 percent and the ambient temperature was 25° C.

The control test panels which did not contain the stable free radical cured tack-free after 3 seconds of exposure to the ultraviolet radiation whereas those containing the stable free radical were still tacky at the end of 3 seconds but fully cured to a tack-free condition after 10 seconds exposure. Those specimens coated with the control formulation exhibited a very strong mercaptan odor whereas those specimens containing the stable free radical exhibited only a very faint trace of a mercaptan odor.

EXAMPLE TWO

Triphenyl sulfonium hexafluorophosphate (TPS) was prepared in accordance with the method of J. Knapcyk et al, Journal of American Chemical Society, Volume 91, page 145 (1969). The following standard formulation was prepared:

| Component | Parts |
|---|---|
| 3,4-epoxy cyclohexylmethyl-3,4-epoxy cyclohexane carboxylate (sold by Ciba-Geigy under the designation CY-179) | 77.62 |
| butanediol aliphatic diglycidyl ether (sold by Ciba-Geigy under the designation RD-2) | 19.43 |
| silicone resin flow agent (sold under the designation SR-82 by General Electric) | 2.40 |
| Flow agent (sold by Byk-Malinckrodt under the designation BYK T-104) | 0.50 |
| sulfonium salt photoinitiator (a 33⅓ by weight solution in propylene carbonate of triphenyl sulfonium hexafluorophosphate | 6.0 |

To 100 parts of one aliquot of this formulation were added 3.76 parts 2,2-diphenyl-1-picrylhydrazyl. The modified and unmodified control compositions were coated on aluminum panels with a No. 3 wire wound rod and exposed to a 360 watt UVIARC lamp for a period of time sufficient to produce a tack-free condition; the control required 5 seconds exposure while the modified formulation required 10 seconds exposure. The panels were smelled immediately after exposure; the control evidenced a strong mercaptan odor while the modified formulation exhibited only a very faint mercaptan odor.

Adhesion was measured by applying an adhesive tape to the coating after it had cured after exposure to ultraviolet radiation and the pulling the tape. Both coatings failed this adhesion test unless baked at 210° C. following ultraviolet exposure; the control required a 4 minute baking period whereas the modified formulation required an 8 minute baking period.

Both coatings were subjected to a test involving rubbing with a pad wet with methylethylketone (MEK); the unbaked control survived 100 rubs while the unbaked modified formulation servived only 60 rubs. When both coatings were baked for 4 minutes at 210° C., both easily passed a 100 rub test.

Thus, the odor controlled formulations evidenced an acceptable difference in cure rate, adhesion and MEK rub resistance, while effecting a highly desirable diminution of the undesirable mercaptan odor which has characterized photopolymerizable compositions containing sulfonium salt photoinitiators.

From the foregoing detailed specification and examples, it can be seen that the photopolymerizable compositions of the present invention utilize sulfonium salt photoinitiators but evidence clearly reduced or eliminated sulfur or mercaptan odors. The improved compositions are relatively stable over extended periods and polymerize rapidly to produce coatings with desirable mechanical properties.

Having thus described the invention, I claim:

1. A photopolymerizable composition comprising:

A. 50-99 percent by weight of a cationically polymerizable material;
   B. at least 0.1 percent by weight of a sulfonium salt photoinitiator which decomposes upon exposure to an electromagnetic radiation to provide a Lewis acid to initiate polymerization of said cationically polymerizable material, said sulfonium salt photoinitiator upon decomposition generating an odorous organic sulfur compound; and
   C. 0.1-15 percent by weight of a stable free radical operable to react with the organic sulfur compound released upon photodecomposition of said sulfonium salt photoinitiator to reduce the sulfur odor generated thereby, said stable free radical being soluble in the polymerizable material and stable in the composition at ambient temperatures.

2. The composition of claim 1 wherein said cationically polymerizable material includes an epoxidic prepolymer material in an amount providing at least about 40 percent by weight thereof.

3. The composition of claim 1 wherein said sulfonium salt photoinitiator has the following structural formula:

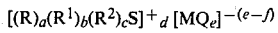

where R is a monovalent aromatic organic radical; $R^1$ is a monovalent organic aliphatic radical selected from alkyl, cycloalkyl and substituted alkyl; $R^2$ is a polyvalent organic radical forming a heterocyclic or fused ring structure selected from aliphatic radicals and aromatic radicals; M is a metal or metalloid; Q is a halogen radical; a is a whole number equal to 0 to 3 inclusive; b is a whole number equal to 0 to 2 inclusive; c is a whole number equal to 0 or 1; and where the sum of $a+b+c$ is a value equal to 3 or the valence of S; $d = e - f$; $f =$ valence of M and is an integer equal to from 2 to 7 inclusive; and e is greater than f and is an integer having a value up to 8.

4. The composition of claim 1 wherein said sulfonium salt photoinitiator has the following formula:

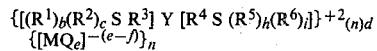

wherein Y may be omitted or may be a bridging atom or group which connects $R^3$ and $R^4$, e.g., a divalent sulfur —S—, a divalent oxygen —O—, a divalent nitrogen

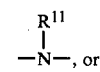

a divalent carbon

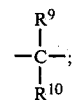

or a ketone group

wherein $R^2$ and $R^6$ are monovalent organic aliphatic radicals selected from alkyl, cycloalkyl and substituted alkyl; $R^1$ and $R^5$ are organic aromatic radicals which may or may not be ring-substituted; wherein R³ and R⁴ are organic aromatic radicals which may or may not be ring-substituted; wherein R⁹, R¹⁰ and R¹¹ may be hydrogen, or substituted or unsubstituted alkyl or aryl groups; wherein b and h may be equal to the integer 0, 1 or 2; wherein c and i may be equal to the integer 0, 1 or 2; the sum of b+c, or of h+i being 2; wherein d=½ (e−f) and n is the multiplier of d necessary to produce a whole number; wherein f=the valence of M and is an integer from 2-7 inclusive; wherein e is greater than f and is an integer having a value up to 8.

5. The composition of claim 1 wherein said sulfonium salt photoinitiator has the following formula:

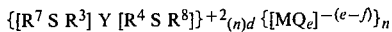

wherein Y may be omitted or may be a bridging atom or group which connects R³ and R⁴, e.g., a divalent sulfur —S—, a divalent oxygen —O—, a divalent nitrogen

or a divalent carbon

or a ketone group

wherein R³ and R⁴ are organic aromatic radicals; wherein R⁷ and R⁸ are polyvalent organic radicals forming a heterocyclic or fused ring structure with the sulfur atom and may be the same or different; wherein R⁹, R¹⁰ and R¹¹ may be hydrogen, or substituted or unsubstituted alkyl or aryl groups; wherein d=½ (e−f) and n is the multiplier of d necessary to produce a whole number; wherein f=the valence of M and is an integer from 2-7 inclusive; wherein e is greater than f and is an integer having a value up to 8.

6. The composition of claim 3 wherein said sulfonium salt photoinitiator is present in an amount equal to 0.1-10 percent by weight of the composition and wherein said stable free radical is present in an amount equal to at least about the molar equivalent of the sulfonium salt photoinitiator.

7. The composition of claim 4 wherein said sulfonium salt photoinitiator is present in an amount equal to 0.1-10 percent by weight of the composition and wherein said stable free radical is present in an amount equal to at least twice the molar equivalent of the sulfonium salt photoinitiator.

8. The composition of claim 5 wherein said sulfonium salt photoinitiator is present in an amount equal to 0.1-10 percent by weight of the composition and wherein said stable free radical is present in an amount equal to at least about twice the molar equivalent of the sulfonium salt photoinitiator.

9. The composition of claim 1 wherein said stable free radical is an organic hydrazyl with electron withdrawing substitutents on the arylamino ring.

10. The composition of claim 9 wherein said stable free radical is 2,2-diphenyl-1-picrylhydrazyl.

11. In a method of cationic polymerization, the steps comprising:
   A. admixing 50-99 parts by weight of a cationically polymerizable material, at least 0.1 part by weight of a sulfonium salt photoinitiator which decompoes upon exposure to electromagnetic radiation to provide a Lewis acid to initiate polymerization of said cationically polymerizable material, said sulfonium salt photoinitiator upon decomposition generating an odorous organic sulfur compound; and 0.1-15 percent by weight of a stable free radical operable to react with the organic sulfur compound released upon photodecomposition of said sulfonium salt photoinitiator to reduce the sulfur odor genrated thereby, said stable free radical being soluble in the polymerizable material and stable in the composition at ambient temperatures; and
   B. exposing said composition to electromagnetic radiation to decompose said sulfonium salt photoinitiator to generate a Lewis acid to initiate polymerization of said polymerizable material, said free radical reacting with organic sulfur compounds generated by decomposition of said sulfonium salt photoinitiator, said polymerization being characterized by substantial freedom from malodorous sulfur compounds.

12. The method of claim 11 wherein said photopolymerizable composition is applied to a substrate as a coating prior to said step of exposure to electromagnetic radiation.

13. The method of claim 11 wherein said cationically polymerizable material includes an epoxidic prepolymer material in an amount providing at least about 40 percent by weight thereof.

14. The method of claim 11 wherein said stable free radical is an organic hydrazyl with electron withdrawing substituents on the arylamino ring.

15. The method of claim 11 wherein said stable free radical is 2,2-diphenyl-1-picrylhydrazyl.

* * * * *